United States Patent
Novotny et al.

(10) Patent No.: US 12,493,817 B2
(45) Date of Patent: Dec. 9, 2025

(54) PERFORMING DATA PRE-PROCESSING OPERATIONS DURING DATA PREPARATION OF A MACHINE LEARNING LIFECYCLE

(71) Applicant: International Business Machines Corporation, Armonk, NY (US)

(72) Inventors: Petr Novotny, Mount Kisco, NY (US); Qi Zhang, Elmsford, NY (US); Lei Yu, Sleepy Hollow, NY (US); Hong Min, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 16/903,872

(22) Filed: Jun. 17, 2020

(65) Prior Publication Data

US 2021/0398012 A1 Dec. 23, 2021

(51) Int. Cl.
*G06N 20/00* (2019.01)
*G06F 16/21* (2019.01)
*G06F 16/242* (2019.01)
*G06F 16/28* (2019.01)

(52) U.S. Cl.
CPC ............. *G06N 20/00* (2019.01); *G06F 16/21* (2019.01); *G06F 16/2433* (2019.01); *G06F 16/284* (2019.01)

(58) Field of Classification Search
None
See application file for complete search history.

(56) References Cited

U.S. PATENT DOCUMENTS

| | | | |
|---|---|---|---|
| 7,318,051 B2 | 1/2008 | Weston et al. | |
| 7,359,913 B1* | 4/2008 | Ordonez | G06F 16/285 |
| | | | 707/999.102 |
| 9,652,714 B2 | 5/2017 | Achin et al. | |
| 10,169,433 B2 | 1/2019 | Lerios et al. | |
| 10,338,968 B2* | 7/2019 | Bequet | G06F 9/4843 |
| 10,445,657 B2* | 10/2019 | Qian | G06K 9/6256 |
| 10,497,250 B1* | 12/2019 | Hayward | G06N 3/088 |

(Continued)

OTHER PUBLICATIONS

Google: "Data Set Preprocessing and Transformation in a Database System", Ordonez, C.; 2011.

(Continued)

*Primary Examiner* — Loan T Nguyen
(74) *Attorney, Agent, or Firm* — Anthony M. Pallone

(57) ABSTRACT

In accordance with an embodiment of the invention, a method is provided for performing data pre-processing operations during data preparation of a machine learning lifecycle. The method includes defining one or more data pre-processing functions for applying to data stored in a dataset, executing one or more learn functions for learning the data, and executing one or more transform functions for transforming the data. Each of the one or more learn functions generates a first Structured Query Language (SQL) statement representing a definition of corresponding learn function for corresponding defined data pre-processing function. Each of the one or more transform functions generates a second SQL statement representing a definition of corresponding transform function for corresponding defined data pre-processing function. The dataset is stored in a database.

19 Claims, 6 Drawing Sheets

(56) References Cited

U.S. PATENT DOCUMENTS

| | | | |
|---|---|---|---|
| 10,679,012 B1* | 6/2020 | Salimov | G06F 40/30 |
| 2002/0083067 A1* | 6/2002 | Tamayo | G06F 16/951 |
| 2005/0102292 A1* | 5/2005 | Tamayo | G06F 16/951 |
| 2009/0006346 A1* | 1/2009 | C N | G06F 16/24537 |
| 2017/0243140 A1 | 8/2017 | Achin et al. | |
| 2018/0018602 A1* | 1/2018 | DiMaggio | G16H 40/20 |
| 2019/0012403 A1* | 1/2019 | Bequet | G06F 16/9014 |
| 2019/0034767 A1* | 1/2019 | Sainani | G06F 16/2465 |
| 2019/0095801 A1* | 3/2019 | Saillet | G06N 20/00 |
| 2019/0235484 A1* | 8/2019 | Ristovski | G05B 23/0283 |
| 2020/0007158 A1* | 1/2020 | Cooper | H03M 7/40 |
| 2020/0050612 A1* | 2/2020 | Bhattacharjee | G06F 16/24526 |
| 2020/0065303 A1* | 2/2020 | Bhattacharjee | G06F 16/278 |
| 2020/0134486 A1* | 4/2020 | Jiang | G16B 40/00 |
| 2020/0167914 A1* | 5/2020 | Stamatoyannopoulos | G06T 7/0012 |
| 2020/0210525 A1* | 7/2020 | Yang | G06F 16/3329 |
| 2020/0279181 A1* | 9/2020 | O'Reilly | G06N 20/00 |
| 2020/0279200 A1* | 9/2020 | Makhija | G06K 9/62 |
| 2020/0327371 A1* | 10/2020 | Sharma | G06N 5/04 |
| 2021/0074269 A1* | 3/2021 | Duong | G10L 15/063 |
| 2021/0224585 A1* | 7/2021 | Schmidt | G06F 18/217 |
| 2024/0012810 A1* | 1/2024 | Lee | G06N 20/00 |

OTHER PUBLICATIONS

Google: "In-Database Machine Learning: Gradient Descent and Tensor Algebra for Main Memory Database Systems", Schule, M. et al.; 2019.

ip.com: "Automatic Denormalization of Databases", Anonymously; Aug. 17, 2018.

ip.com: "A Method for Time Prediction on Database System Statistics Collection and SQL Rebind by Machine Learning", Anonymously; May 31, 2018.

ip.com: "Methodology for Performing Machine Learning on Database Data in a SQL Statement", Anonymously; Jan. 13, 2018.

http://keystone-ml.org/, "KeystoneML", Accessed on Aug. 5, 2022, 3 pages.

https://mldb.ai/, "MLDB is the Machine Learning Database", Accessed on Aug. 5, 2022, 4 pages.

\* cited by examiner

```
# Example 2 - SQL + DataFrameMapper
dbconn = DBConnection("dbname=db1 user=postgres password='password' ")
sdf = dbconn.get_sdf("select * from s1.simulated_dataset order by index")

mapper = DPSqlDataFrameMapper([
    ('code_20', DPLabelEncoder()),
    ('code_21', DPMinMaxScaler()),
    ('code_22', DPMaxAbsScaler()),
    ('code_23', DPBinarizer(5)),
    ('code_24', DPBinarizer(0)),
    ('code_25', DPStandardScaler()),
])

mapper.fit(sdf)
mapper.transform(sdf)
df_transform = sdf.execute_df()
```

FIG. 3

```
SELECT AVG(code_20) AS mean_value, STDDEV(code_20) AS stddev_value
FROM (select * from s1.simulated_dataset order by index) AS data_table
```

FIG. 4

```
SELECT
(CAST(code_20 AS FLOAT) - 49.3720000000000000) / 28.7669404185304363 as
code_20_encoded
  FROM (select * from s1.simulated_dataset order by index) AS data_table
```

FIG. 5

```
DROP TABLE s1.fit_simulated_dataset_code_20_DPLabelEncoder

SELECT
label_key,
(ROW_NUMBER () OVER (ORDER BY label_key)) - 1 AS label_encoded
INTO s1.fit_simulated_dataset_code_20_DPLabelEncoder
FROM (SELECT DISTINCT code_20 AS label_key FROM (select * from
s1.simulated_dataset order by index) AS data_table ) AS table_input;

ALTER TABLE s1.fit_simulated_dataset_code_20_DPLabelEncoder
ADD CONSTRAINT s1_fit_simulated_dataset_code_20_DPLabelEncoder_key
PRIMARY KEY (label_key);
```

FIG. 6

```
SELECT
s1.fit_simulated_dataset_code_20_DPLabelEncoder.label_encoded as
code_20_encoded
 FROM (select * from s1.simulated_dataset order by index) AS
data_table
LEFT OUTER JOIN s1.fit_simulated_dataset_code_20_DPLabelEncoder ON
data_table.code_20 =
s1.fit_simulated_dataset_code_20_DPLabelEncoder.label_key
```

FIG. 7

```
SELECT
s1.fit_simulated_dataset_code_20_DPLabelEncoder.label_encoded as
code_20_encoded,
(CAST(code_21 AS FLOAT) - 1) / 99 as code_21_encoded,
(CAST(code_22 AS FLOAT)) / 100 as code_22_encoded,
CASE WHEN code_23 > 5 THEN 1 ELSE 0 end as code_23_encoded,
CASE WHEN code_24 > 0 THEN 1 ELSE 0 end as code_24_encoded,
(CAST(code_25 AS FLOAT) - 50.7840000000000000) / 28.6111583332736662 as
code_25_encoded
 FROM (select * from s1.simulated_dataset order by index) AS data_table
LEFT OUTER JOIN s1.fit_simulated_dataset_code_20_DPLabelEncoder ON
data_table.code_20 =
s1.fit_simulated_dataset_code_20_DPLabelEncoder.label_key
```

*FIG. 8*

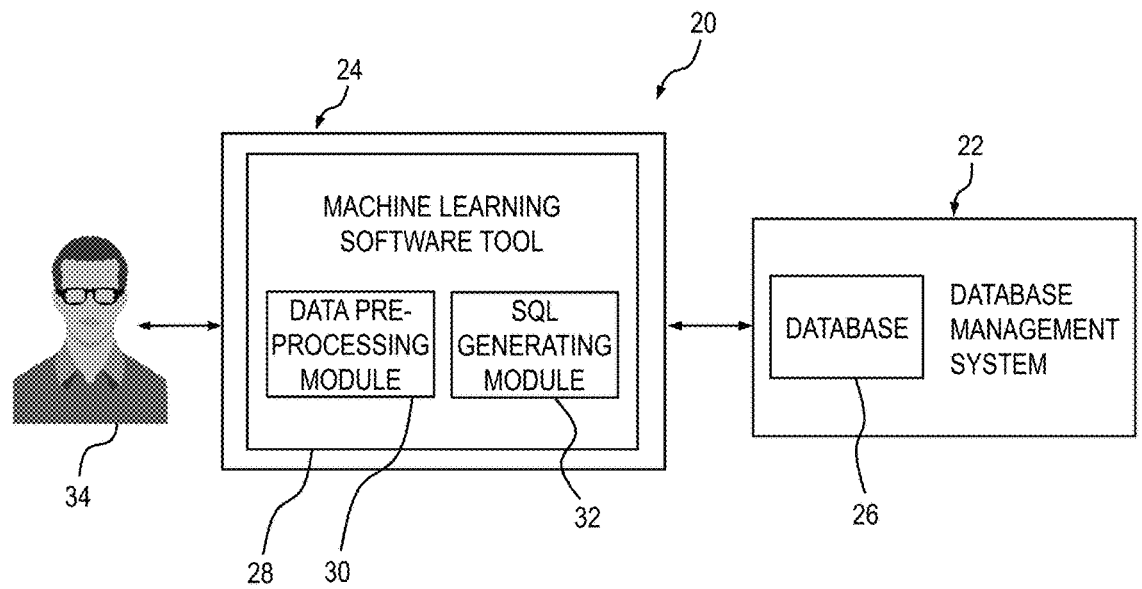

*FIG. 9*

PERFORMING DATA PRE-PROCESSING OPERATIONS DURING DATA PREPARATION OF A MACHINE LEARNING LIFECYCLE

BACKGROUND

The present invention relates generally to methods and systems for data pre-processing, and, more particularly, to methods and systems for performing data pre-processing operations during data preparation of a machine learning lifecycle.

Machine learning is an application of artificial intelligence that provides computing systems the ability to automatically learn and improve from experience without using explicit instructions or programs. In many industries, machine learning is currently applied to solve real-world business problems by predicting patterns.

One of the most important processes in the machine learning life cycle is the data preparation/pre-processing and pipelining mechanisms. Data pre-processing is an integral step in machine learning as the quality of data and the useful information that can be derived from the data directly affects the ability of machine learning models to learn. However, the training stage of data pre-processing is typically a lengthy and computationally expensive process, which may require processing of extensive amount of data. In addition, the data to be pre-processed are typically stored in not-so-optimized data structures. Accordingly, there is a need for an improved method and system for performing data pre-processing operations during data preparation of a machine learning lifecycle.

SUMMARY

The present invention, as manifested by embodiments thereof, provides a method for performing data pre-processing operations during data preparation of a machine learning lifecycle. The method includes defining one or more data pre-processing functions for applying to data in a dataset, executing one or more learn functions for learning the data, and executing one or more transform functions for transforming the data. Each of the one or more learn functions generates a first Structured Query Language (SQL) statement representing a definition of corresponding learn function for corresponding defined data pre-processing function. Each of the one or more transform functions generates a second SQL statement representing a definition of corresponding transform function for corresponding defined data pre-processing function. The dataset is stored in a database.

In accordance with another embodiment of the invention, a system is provided for performing data pre-processing operations during data preparation of a machine learning lifecycle. The system includes a database management system and a computing system capable of communicating with the database management system. The computing system includes a memory, at least one processor coupled to the memory, and a machine learning software tool having a data pre-processing module and SQL generating module. The data pre-processing module includes a first computing library for performing data pre-processing functions, and the SQL generating module includes a second computing library for translating logic of each of the data pre-processing functions to SQL language and generating SQL statement for executing the SQL statement in the database.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein:

FIG. 3 depicts exemplary computer source code for performing data pre-processing operations during data preparation of a machine learning lifecycle, according to an embodiment of the present invention;

FIG. 4 depicts exemplary Structured Query Language (SQL) source code for fit function for StandardScaler defined by the computer source code in FIG. 3;

FIG. 5 depicts exemplary SQL source code for transform function for StandardScaler defined by the computer source code in FIG. 3;

FIG. 6 depicts exemplary SQL source code for fit function for LabelEncoder defined by the computer source code in FIG. 3;

FIG. 7 depicts exemplary SQL source code for transform function for LabelEncoder defined in the computer source code in FIG. 3;

FIG. 8 depicts exemplary SQL source code for aggregation of transform functions for each of the data pre-processing functions defined in the computer source code in FIG. 3;

FIG. 9 is a block diagram of a system for performing data pre-processing operations during data preparation of a machine learning lifecycle, according to an embodiment of the present invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present disclosure will be described herein in the context of an illustrative method and system for performing data pre-processing operations during the data preparation stage of a machine learning lifecycle. It is to be appreciated, however, that the specific embodiments and/or methods illustratively shown and described herein are to be considered exemplary as opposed to limiting. Moreover, it will become apparent to those skilled in the art given the teachings herein that numerous modifications can be made to the embodiments shown that are within the scope of the claims. That is, no limitations with respect to the embodiments shown and described herein are intended or should be inferred.

Figure 1:
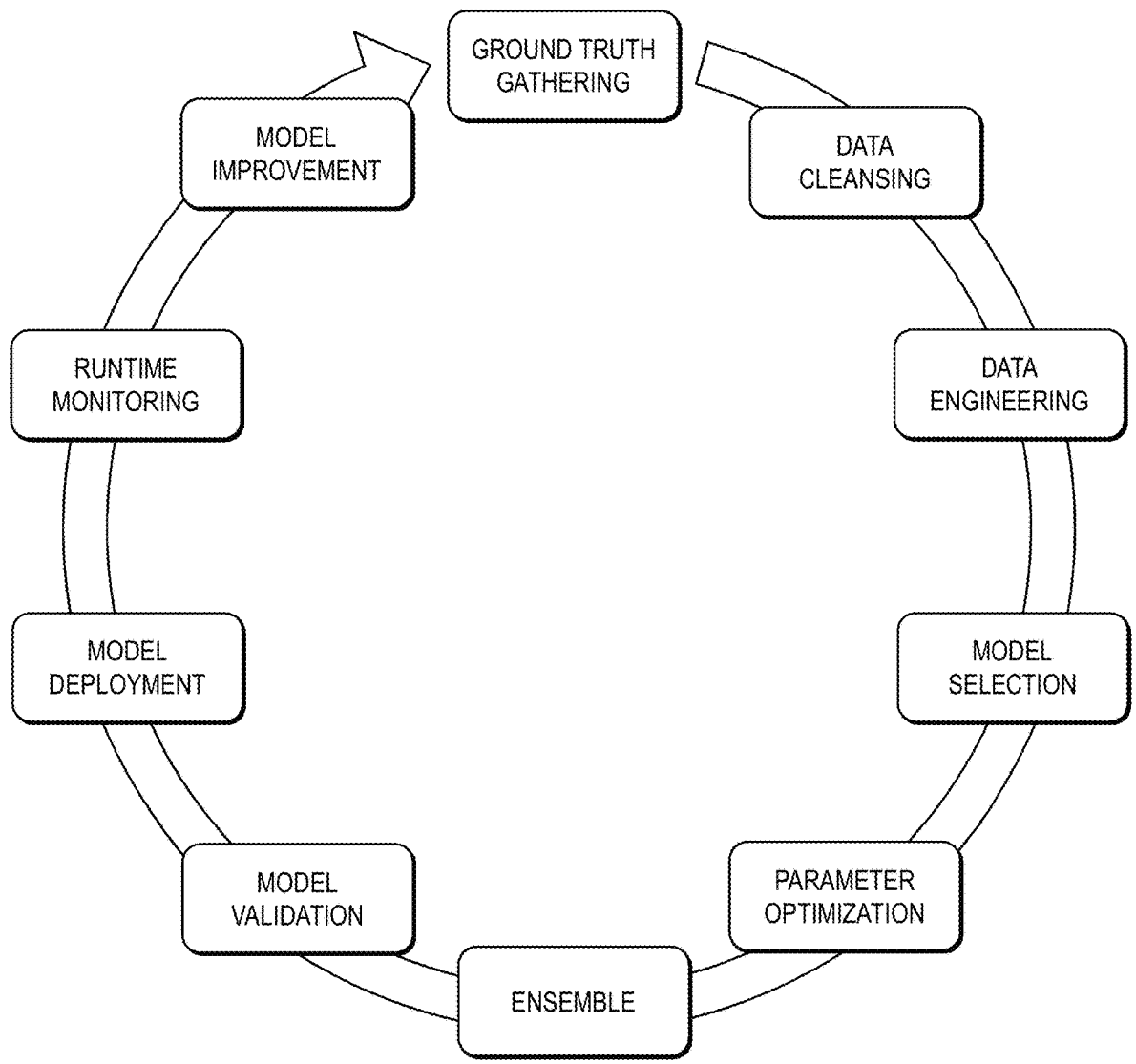
FIG. 1 is a schematic diagram conceptually depicting at least a portion of exemplary processes typically involved in a machine learning lifecycle.

As shown in FIG. 1, various processes need to be performed during the lifecycle of applying machine learning to a real-world business problem. A first step of the machine learning lifecycle is identifying the business problem to be solved and understanding business requirements to improve operations; that is, a ground truth gathering phase.

A second step of the machine learning lifecycle is to collect all raw data related to the business requirements and prepare the data for use in applying machine learning. This step involves data cleansing and/or data engineering for use in training of machine learning models (or algorithms). Typically, data cleaning is performed to identify and remove errors in data, in order to create a clean (reliable) dataset for machine learning. This step is crucial because good data preparation and engineering produces clean and reliable data, which leads to more accurate model predictions. For example, if data is missing, the machine learning algorithm cannot use it. If data is invalid, the machine learning algorithm produces less accurate or even misleading outcomes.

A next step in the machine learning lifecycle is to select a model from a collection of candidate machine learning models for training with the prepared and cleaned dataset. Examples of suitable machine learning models include regression algorithms, instance-based algorithms, regularization algorithms, decision tree algorithms, clustering algorithms, association rule learning algorithms, artificial neural network algorithms, deep learning algorithms, dimensionality reduction algorithms, ensemble algorithms, etc.

A fourth step in the machine learning lifecycle is to improve the selected model by tuning or optimizing the hyperparameters. During this step, a set of optimal hyperparameters are selected and the selected hyperparameters determine the structure of the machine learning model. Next, during an ensemble state, if two or more models are selected, then the models are combined to produce one optimal predictive model. Once the selected model is trained and tuned, during the model validation step, the model is evaluated with the testing dataset. The model is validated until it produces a desired behavior.

After the model validation, the machine learning model is then released to the production environment during a model deployment step to start making predictions by processing unseen (or new) data. Finally, a last step in the machine learning lifecycle is to monitor (e.g., runtime monitoring) the deployed model and continue to improve its performance.

Data pre-processing operations during the data preparation stage of a machine learning lifecycle are crucial because good data preparation produces clean and reliable data, which leads to more accurate machine learning model predictions. For example, as stated above, if some data are missing in the dataset, machine learning algorithms cannot use the dataset to predict a real world problem. If some data in the dataset are invalid, the machine learning algorithms produce less accurate or even misleading outcomes.

Currently, the data pre-processing operations are typically performed by using machine learning software tools (e.g., Python®) and libraries (e.g., Python® scikit-learn library) that are available in the market. The steps typically involved in the data pre-processing operations are loading data to be processed to a client's memory, applying fit function for learning the data, producing learned information from fit function, transforming the data based on the learned information, and moving the processed data to a location of machine learning models. However, the aforementioned first four steps are very time-consuming and computationally expensive processes because the steps are typically performed on massive amounts of data, with data stored in not-so-optimized structures (e.g., pandas Data Frames). In addition, the data to be processed are typically moved to a processing site (e.g., client memory), thereby jeopardizing security and privacy of the data.

The present invention solves the aforementioned existing issues with the current data pre-processing operations by providing a novel method/mechanism for performing data pre-processing operations. The method is based on offloading of data pre-processing to where the data to be processed are stored, e.g., databases, warehouses, etc., thereby allowing the data pre-processing operations to leverage advanced data processing mechanisms available in SQL based database servers. Thus, the method of performing data pre-processing operations disclosed herein provides several benefits. First, the method allows the data to be processed in the system where the data are stored such as relational database management system (RDBMS) or other databases (e.g., DB2®). This eliminates the step of moving/retrieving the data to a processing site (e.g., client memory). As stated above, processing at the location of the data allows use of the components available in the database, such as database SQL compilers, to leverage knowledge of data structures and distribution with fast algorithms to enhance performance of the data pre-processing operations. Secondly, because the data are not moved to a processing site, the method disclosed herein increases data security and privacy by leveraging built-in security features of database servers.

Figure 2:
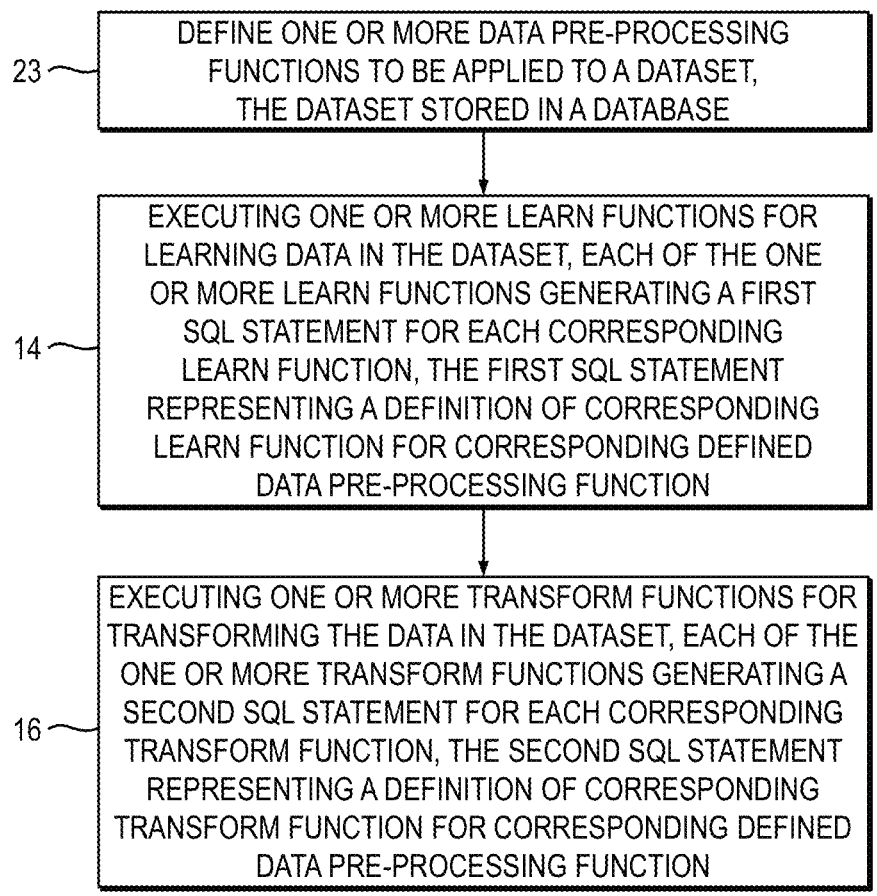
FIG. 2 is a flowchart depicting at least a portion of an exemplary method for performing data pre-processing operations during data preparation of a machine learning lifecycle, according to an embodiment of the present invention.

Referring now to FIG. 2, a method 10 for performing data pre-processing operations during data preparation stage of a machine learning lifecycle is described, according to one or more embodiments of the present invention. In a first step 12, a user (e.g., data scientist) may define one or more data pre-processing functions for applying to data stored in a dataset. The dataset is stored in a database configured in a database management system. The database management system may be a relational database management system (RDBMS) or other databases (e.g., DB2®). Non-limiting examples of the data include financial data, demographical data, and medical data. In addition, the type of the data may be any data type that the database is able to store such as text, numeric, image, etc.

The user may utilize any one of the machine learning software tools and libraries currently available in the market to perform the data-pre-processing operations by defining appropriate data pre-processing functions (e.g., such as StandardScaler for scaling data, LabelEncoder for converting descriptive labels (e.g., data with string data type)). For example, the Python® library scikit-learn allows the user to define and perform typical data pre-processing operations with lines of computer source code (e.g., Python® code), as shown in FIG. 3. In FIG. 3, a plurality of data pre-processing functions are defined with Python® code to instantiate the Python® scikit-learn library. Other machine learning software tools and libraries such as Apache Spark MLlib, Apache Mahout, SAS, and R may also be used to define and perform the data pre-processing functions shown in FIG. 3.

Referring again to FIG. 3, the defined data pre-processing functions include LabelEncoder as "DPLabelEncoder( )", MinMaxScaler as "DPMinMaxScaler( )", MaxAbsScaler as "DPMaxAbsScaler( )", Binarizer having a parameter of 5 as "DPBinarizer(5)", Binarizer having a parameter of 0 as "DPBinarizer(0)", and StandardScaler as "DPStandardScaler( )". These defined functions are some examples of currently available data pre-processing functions in machine learning software tools and libraries. Thus, while six data pre-processing functions are defined in the depicted computer source code in FIG. 3, the user may define any number of data pre-processing functions depending on purpose and goal of machine learning model/algorithm predictions.

Each of the plurality of defined data pre-processing functions in FIG. 3 performs a different operation on a different set of data. For example, StandardScaler computes the mean and standard deviation of a specified data so as to be able to later reapply the transformation on the data. An alternative standardization is scaling data to lie between a given minimum and maximum value, often between zero and one, or so that the maximum absolute value of each data is scaled to unit size. This can be achieved by using MinMaxScaler or MaxAbsScaler. Binarization is a process of thresholding numerical data to get boolean values. LabelEncoder can be used to normalize labels. It can also be used to transform non-numerical labels (e.g., string type data) to numerical values.

In the depicted computer source code in FIG. 3, DPLabelEncoder( ), DPMinMaxScaler( ), DPMaxAbsScaler( ), DPBinarizer(5), DPBinarizer(0), and DPStandardScaler( ) are defined to apply on the data stored in a specific column. For example, DPLabelEncoder( ), DPMinMaxScaler( ), DPMaxAbsScaler( ), DPBinarizer(5), DPBinarizer(0), and DPStandardScaler( ) are defined to apply the data stored in the "code_20" column, "code_21" column, "code_22" column, "code_23" column, "code_24" column, and "code_25" column, respectively. These aforementioned columns are included in the "simulated_dataset" table, which is configured in the "db1" database.

Referring again to FIG. 2, once the pre-processing functions are defined, in a second step 14, fit function for each of the one or more defined data pre-processing functions is executed to learn about the data (or rows) stored in the specified column of the specified table. For example, executing fit function allows DPLabelEncoder to learn about the data stored in the "code_20" column of the "simulated_dataset" table configured in the database "db1".

In the present invention, while the data pre-processing functions are defined on the client device using a machine learning software tool and library (e.g., Python® scikit-learn library), the actual execution of each of the defined data pre-processing functions is performed at the location where the data is stored. Thus, the execution of the fit function for each of the one or more data pre-processing functions is performed by first generating a first SQL statement for each corresponding defined data pre-processing function and executing each generated first SQL statement in the database. Each first SQL statement represents the logic or definition of the corresponding defined data pre-processing function. For example, FIG. 4. depicts source code for the first SQL statement for the data pre-processing function of StandardScaler, which is defined by the user (as shown in FIG. 3), for deriving mean and standard deviation of the data stored in the "code_20" column of the "simulated_dataset" table. As stated above, StandardScaler standardizes features by removing the mean and scaling the data to unit variance. The standard scope of a sample X is calculated as Z=(X−U)/S, wherein X is the training data samples, U is the mean of the training data samples, and S is the standard deviation of the training data samples. The first SQL statement shown in FIG. 4 defines the aforementioned logic of StandardScaler function. Each first SQL statement for corresponding defined data pre-processing function is generated via a SQL generator module, which will be described in greater detail below.

Another example of the first SQL statement is shown in FIG. 6. FIG. 6. Depicts source code for the first SQL statement for the defined data pre-processing function of LabelEncoder for deriving encode labels with value between 0 and n_classes−1 by learning the data stored in the "code_20" column of the "simulated_dataset" table.

Once the first SQL statement is generated for each of the defined data pre-processing functions, the SQL statements are executed in the database. As stated above, each of the first SQL statements executes against the specified column in the specified table and learns about the data stored in the specified column. After completion of learning the data, each of the first SQL statements produces learned information for each corresponding defined data pre-processing function. For example, the first SQL statement for StandardScaler generates learned information of mean and standard deviation of the data stored in the specified column, and the first SQL statement for LabelEncoder generates learned information of ordered labels and encoded values, which may be represented as a dictionary of labels. The dictionary of labels is simply a mapping of each of non-numeric values (e.g., data in string data type) to a numeric value. The learned information may be stored in a storage mechanism such as client's memory, a file, or a temporary database storage. In FIG. 6, the learned information produced from fit function of LabelEncoder is stored in a temporary tabled called "fit_simulated_dataset_code_20_DPLabelEncoder." The learned information are later used in transform functions for transforming the data (rows) stored in the specified column.

Referring again to FIG. 2, in a third step 16, transform function for each of the one or more defined data pre-processing functions is executed to transform the data stored in the specified column of the table by applying the learned information produced from corresponding learn function. For example, in FIG. 3, transform function for LabelEncoder is applied to the "code_20" column of "simulated_dataset" table to transform the data (rows) stored therein using the learned information produced from corresponding fit function.

Similar to the execution of fit function, the execution of the transform function for each of the one or more data pre-processing functions is performed by first generating a second SQL statement and executing each generated second SQL statement in the database. Each second SQL represents the logic or definition of corresponding defined data pre-processing function for transforming data in the specified column. For example, FIG. 5 depicts source code for the second SQL statement for the data pre-processing function of StandardScaler, which is defined by the user (as shown in FIG. 3). This second SQL statement represents a scaling formula that includes the learned information/variables (mean and standard deviation) from corresponding fit function for applying to each value (row) in the "code_20" column. Each second SQL statement for corresponding defined data pre-processing function is generated via a SQL generator module, which will be described in greater detail below.

Another example of the second SQL statement is shown in FIG. 7. FIG. 7 depicts source code for the second SQL statement for the defined data pre-processing function of LabelEncoder, which is also defined by the user (as shown in FIG. 3). This second SQL statement represents transforming each value (row) in the "code_20" column to corresponding encoded value produced from corresponding fit function.

To accelerate and enhance transformation process of the data pre-processing operation, a plurality of second SQL statements generated for the defined data pre-processing functions are aggregated into a single SQL statement for execution. Aggregation of the plurality of second SQL statements may be achieved by DataFrameMapper function available in the machine learning software tools and libraries. As shown in FIG. 8, all of the second SQL statements for the one or more defined data pre-processing functions are represented as a single SQL statement. In this example, six individual second SQL statements are generated and aggregated as a single SQL query for executing in the database to transform the data stored in each specified column of the specified table.

Once above described steps are completed, the processed data then may be moved/retrieved to the location of machine learning models for feeding the data to the machine learning models for training and predictions.

Referring to FIG. 9, a system 20 for performing data pre-processing operations during data preparation stage of a machine learning lifecycle is described, according to one or more embodiments of the present invention. The system 20 generally includes a database management system 22 and a computing system 24 configured to communicate with the database management system 22. The database management system 22 is configured to manage a database 26 where the data for data pre-processing operations are stored. The database 26 may be configured with any type of database such as a relational database, a distributed database, an object database. The database management system 22 may be of any relational database management system or other databases such as DB2®.

A machine learning software tool (e.g., Python®) 28 is installed on the computing system 24 for defining the data pre-processing functions. The machine learning software tool 28 includes a data pre-processing module 30 and a SQL generating module 32. The data pre-processing module 30 includes a first library capable of defining and performing data pre-processing functions by a user 34 during the data preparation stage of a typical machine learning lifecycle. The SQL generating module 32 includes a second library having a plurality of classes. The SQL generating module 32 is a customized library and may be used by the machine learning software tool 28. The SQL generating module 32 provides a mechanism to communicate with the data pre-processing module 30 and transforms the client code (e.g., Python® code) to use the second library in the SQL generating module 32. In addition, the SQL generating module 32 is capable of translating logics/definitions of all existing data pre-processing functions/operations (e.g., StandardScaler, LabelEncoder) available in the existing machine learning software tools and libraries (e.g. Python® scikit-learn library) 28 to SQL language and generating the first and second SQL statements described above for executing the SQL statements in the database 26. Thus, the SQL generating module 32 has the same API interfaces and behaviors as the existing machine learning software tools and libraries (e.g., Python® scikit-learn library) 28 and produces identical results as data pre-processing operations performed with the existing machine learning software tools and libraries 28.

As described above, the first and second SQL statements are generated based on the definition of the various functions. In addition, the generation of the SQL statements may be based on a) capabilities and functionalities of the database management system 22 due to SQL differences in different types of database management systems and b) data structure and data storage since SQL may differ if the table/dataset is stored in one location or multiple locations (e.g., partitioned, sharded, or federated tables and databases).

Figure 10:
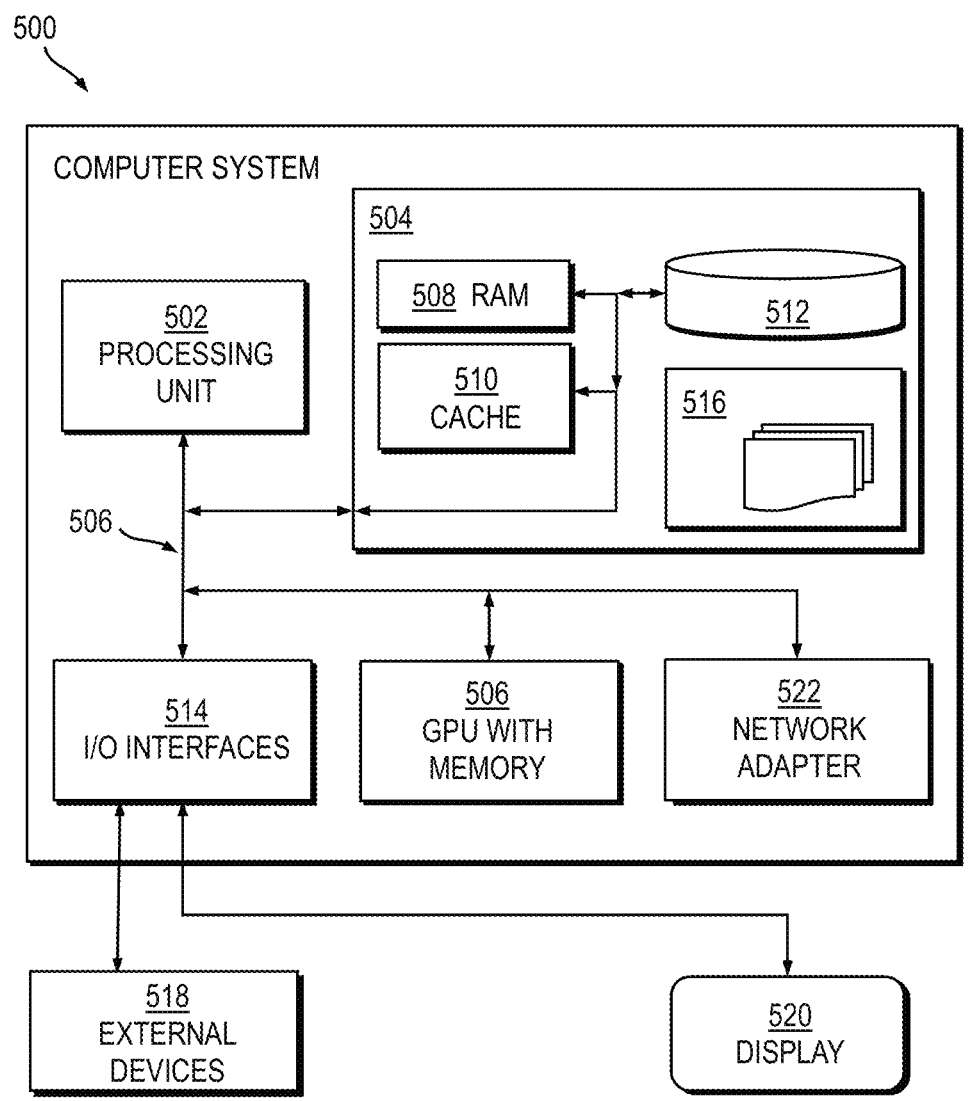
FIG. 10 is a block diagram depicting at least a portion of the exemplary computer system that may be useful in implementing one or more aspects and/or elements of the present invention.

FIG. 10 shows, by way of example only and without restriction, the computing system 500 suitable for executing program code related to the proposed method, according to an embodiment of the invention.

The computing system 500 is only one example of a suitable computer system and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media including memory storage devices.

As shown in FIG. 10, computer system/server 500 is shown in the form of a general-purpose computing device. The components of computer system/server 500 may include, but are not limited to, one or more processors or processing units 502, a system memory 504, and a bus 506 that operatively couples various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a "hard drive"). Although not explicitly shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via input/output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that although not explicitly shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semiconductor or solid-state memory, magnetic tape, a removable computer diskette, a random access memory (RAM), a read-only memory (ROM), a rigid magnetic disk, a flash drive, and an optical disk. Current examples of optical disks include compact disk-read only memory (CD-ROM), compact disk-read/write (CD-R/W), digital versatile disk (DVD) and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, ROM, an erasable programmable read-only memory (EPROM or flash memory), a static random access memory (SRAM), a portable CD-ROM, a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood by those skilled in the art that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another devices to cause a series of operational steps to be performed on the computer, other programmable apparatus or other device to produce a computer implemented process, such that the instructions which execute on the computer, other programmable apparatus, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a," "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus, the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A method for performing data pre-processing operations during data preparation of a machine learning lifecycle, the method comprising:
    defining, by a user on a computing system, one or more data pre-processing functions for applying to data stored in a dataset, the dataset stored in a database of a database management system, wherein each of the one or more data pre-processing functions performs a different operation on a different set of data within the dataset, and wherein each of the one or more data pre-processing functions are defined to apply on data stored in different respective specific columns of the dataset, and wherein the different operation is selected from the group consisting of an operation to scale data, an operation to threshold data, and an operation to normalize labels of data;
    executing, at the database management system, one or more learn functions for learning the data, each of the one or more learn functions corresponding to a respective data pre-processing function of the one or more data pre-processing functions, each of the one or more learn functions generating a first Structured Query Language (SQL) statement for respectively corresponding data pre-processing function, each first SQL statement representing a definition of respectively corresponding learn function for corresponding defined data pre-processing function, each first SQL statement executes against a respective specific column, of the dataset, defined in respectively corresponding data pre-processing function to produce learned information of data stored in the respective specific column;

executing, at the database management system, one or more transform functions to transform the data, each of the one or more transform functions corresponding to a respective executed learn function of the one or more learn functions, wherein executing each of the one or more transform functions generates a respective second SQL statement based on learned information produced by respectively corresponding executed learn function, each second SQL statement representing a definition of corresponding transform function for corresponding defined data pre-processing function;

aggregating each respective second SQL statement into a single SQL statement and transforming the data stored in each specified column of the specified table based on the learned information of data; and storing the transformed data to a location of machine learning models.

2. The method of claim 1, wherein executing the one or more learn functions further comprises:

executing each first SQL statement for respectively corresponding data pre-processing function in the database;

producing learned information of each first SQL statement for respectively corresponding data pre-processing function; and storing the learned information produced from each first SQL statement corresponding data pre-processing function in a storage mechanism.

3. The method of claim 2, wherein executing the one or more transform functions further comprises:

executing the aggregated SQL statement in the database.

4. The method of claim 1, wherein the user is a data scientist.

5. The method of claim 1, wherein the dataset is comprised of one or more of financial data, demographic data, and medical data.

6. The method of claim 1, wherein the dataset comprises at least one of text data type, numeric data type, and image data type.

7. The method of claim 2, wherein the storage mechanism is a memory, a file, a temporary database storage.

8. The method of claim 7, wherein the temporary database storage is a temporary table.

9. The method of claim 1, wherein the database is a relational database.

10. The method of claim 1, wherein the database is configured in a relational database management system.

11. The method of claim 7, wherein the learned information is stored in the temporary database storage.

12. The method of claim 11, wherein the learned information stored in the temporary database storage is a dictionary of labels.

13. The method of claim 1, wherein the data pre-processing functions are defined with a machine learning software tool and library.

14. The method of claim 13, wherein the machine learning software tool and library is Python scikit-learn library.

15. A system for performing data pre-processing operations during data preparation of a machine learning lifecycle, the system comprising:

a database management system, the database management system including a database, the database including a dataset for performing the data pre-processing operations; and a computing system capable of communicating with the database management system, the computing system including a machine learning software tool, the machine learning software tool having a data pre-processing module and SQL generating module, wherein the computing system comprises one or more processors, one or more computer-readable memories, one or more computer-readable tangible storage devices, and program instructions of the machine learning software tool stored on at least one of the one or more computer-readable tangible storage devices for execution by at least one of the one or more processors via at least one of the one or more memories, wherein the data pre-processing module of the computing system includes a first library for defining data pre-processing functions, and wherein each of the data pre-processing functions performs a different operation on a different set of data within the dataset, and wherein each of the one or more data pre-processing functions are defined to apply on data stored in different respective specific columns of the dataset, and wherein the different operation is selected from the group consisting of an operation to scale data, an operation to threshold data, and an operation to normalize labels of data, wherein the SQL generating module includes a second library for translating logic of each of defined data pre-processing functions to respective SQL instructions and generating a corresponding first SQL statement for each defined data pre-processing function, for executing in the database of the database management system, each first SQL statement executes against data in a respective specific column, of the dataset, defined in respectively corresponding data pre-processing function to produce learned information of data stored in the respective specific column, wherein the SQL generating module also generates a corresponding second SQL statement, for executing in the database of the database management system, for each first SQL statement, generation of each second SQL statement is based on learned information produced by respectively corresponding executed first SQL statement, each second SQL statement representing a definition of corresponding transform function for corresponding defined data pre-processing function, wherein each second SQL statement is aggregated into a single SQL statement and transforming the data stored in each specified column of the specified table based on the learned information of data; and wherein the transformed data is stored to a location of machine learning models.

16. The system of claim 15, wherein the database is a relational database.

17. The system of claim 15, wherein the database management system is a relational database management system.

18. The system of claim 15, wherein the second library is a customized library which includes a plurality of classes.

19. The system of claim 15, wherein the first library is Python scikit-learn library.

\* \* \* \* \*